(12) United States Patent
Chen E. Shang

(10) Patent No.: US 7,580,188 B2
(45) Date of Patent: Aug. 25, 2009

(54) CWDM FILTER

(75) Inventor: Chang Chen E. Shang, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 376 days.

(21) Appl. No.: 11/530,091

(22) Filed: Sep. 8, 2006

(65) Prior Publication Data

US 2007/0109649 A1    May 17, 2007

(30) Foreign Application Priority Data

Nov. 11, 2005  (TW) ............................... 94139822 A

(51) Int. Cl.
*G02B 1/10* (2006.01)
(52) U.S. Cl. ...................... 359/586; 359/588; 359/589
(58) Field of Classification Search ................ 359/580, 359/581, 586, 588, 589
See application file for complete search history.

(56) References Cited

U.S. PATENT DOCUMENTS

| | | | |
|---|---|---|---|
| 6,404,521 B1 | 6/2002 | Yang et al. | |
| 6,831,784 B2 | 12/2004 | Takeda | |
| 2005/0099691 A1* | 5/2005 | Hendrix et al. | ............. 359/557 |

\* cited by examiner

*Primary Examiner*—Joshua L Pritchett

(57) ABSTRACT

A CWDM filter includes a substrate and a multi-layer structure coated on one side of the substrate. The multi-layer structure has the construction of $H(LH)^2 4L(HL)^3 H(LH)^3 4L(HL)^3 H(LH)^4 4L(HL)^4 H(LH)^3 4 \ L(HL)^3 H(LH)^4 4L(HL)^4 H(LH)^3 4L(HL)^3 H(LH)^3 4L(HL)^2 HLH4LH/N_S$, wherein $N_S$ is the substrate, L is a low (refraction) index layer with a thickness of $\lambda_0/4$, H is a high (refraction) index layer with a thickness of $\lambda_0/4$, and $\lambda_0$ is the center wavelength of the light transmitting through the CWDM filter.

9 Claims, 2 Drawing Sheets

CWDM FILTER

BACKGROUND OF THE INVENTION

1. Field of the Invention

The present invention relates to an optical filter, especially to a CWDM (Coarse Wavelength Division Multiplex) filter.

2. Description of the Prior Art

An optical filter is an optical element for selecting one or more spectral bands from incident polychromatic light on the basis of absorption and interference of light wave. Commonly, the optical filter may be an absorption filter and an interference filter. The absorption filter allows certain wavelengths of light to pass through while blocking others, which are absorbed by the filter material. However, the absorption filter is impractical because of poor spectrum monochrome and loss of light. The interference filter consists of multiple thin layers of dielectric material having different refractive indices. The multiplayer thin film of the interference filter consists of high and low refraction index layers which are alternately stacked over each other and each of which thickness is a quarter wavelength ($\lambda/4$) of the center wavelength of a desired wavelength range for the filter. The phases of the reflected lights within the high refraction index layers remain unchanged while the phases of the reflected lights within the low refraction index layers deflect 180°.

Due to the differences of the traveling distances (multiples of $2*\lambda 4$) between different lights, lights reflected become superposed together as they proceed ahead thereby producing a light beam having a high intensity within a narrow wavelength range, while the amount of other reflected output lights, which are outside of the narrow wavelength range, have a sharp decrease. Hence, such kind of filters may be high-pass, low-pass, band-pass, or band-rejection.

U.S. Pat. No. 6,831,784 discloses a multiplayer optical thin-film filter. The optical filter has multiple quarter wavelength thick optical thin films with different refractive indices. The filter includes a plurality of unit cavities that are stacked a number of times via a connection layer. Each unit cavity consists of a first reflector layer, a spacer layer in contact with the first reflector layer, and a second reflector layer in contact with the spacer layer. The first reflector layer is a layered body and the second reflector layer is a layered body. The spacer layer is a multiplayer optical thin film with a high refractive index obtained by layering even number of films, or is composed of a multiplayer optical thin film with a low refractive index. The connection layer is a multiplayer optical thin film with a low refractive index obtained by layering odd number of films.

U.S. Pat. No. 6,404,521 discloses an optical filter system for adjust DWDM transmittance. The optical filter system uses a DWDM (N+1)-stage fiber optic cascade tree structure with additional filtering to provide acceptable flat-top band pass response, and to provide acceptable optical isolation when combined with a multiplayer thin film filter. The multi-layer filter may adopt Fabry-Perot Etalon (FPE).

As far as a MAN (Metropolitan Area Network) is concerned, no high requirements are imposed upon the transmission attenuation of simplex optic fibers, neither does it require an optic fiber amplifier. Hence, a relatively wide window of 1200-1700 nm can be used, and even the space between adjacent wavelength channels can be increased to be 10 or 20 nm, a wavelength division multiplex (WDM) system having tens of channels can also be achieved, namely a coarse wavelength division multiplex (CWDM) system. The spacing between different wavelength channels transmitting in one optic fiber is the major parameter to differentiate DWDM and CWDM. The spacing between adjacent wavelength channels of a DWDM system is usually 200 GHz (0.8 nm) or 50 GHz (0.4 nm), and it may become narrower in a future system. However, the CWDM technology makes full use of the feature of short transmission distance of MAN, so that it is not limited to the amplifying wavelength range of EDFA (Erbium doped fiber amplifier). Instead, it can perform wavelength division multiplexing function at a wavelength space much wider than that of a DWDM system in the whole optic fiber propagation window of 1310-1560 nm.

In regard of multiplexer and demultiplexer, the cost differences between a DWDM system and a CWDM system mainly lie in the fact that a CWDM filter contains less layers which makes it cheaper than a DWDM filter.

Nowadays, the widely applied WDM with 0.8 nm wavelength space in a DWDM system commonly adopt multi-layer interference optic filters. An ideal interference filter is an interference band-pass filter with $\lambda/4$ multiple layers with different thickness thereof. It is to insert a coupling layer between two high reflectivity multi-layer cavity structures. The overlap area formed by stacking the two high reflectivity multi-layer cavity structures has a minimum reflection value, and the function of the coupling layer is to remove the minimum reflection value, i.e., to broaden the range of reflected wavelengths thereof. The high reflectivity multi-layer cavity structure consists of 2n+1 layers of alternately stacking high refraction index films (layers) and low refraction index films (layers), whose thickness is $\lambda/4$ (center wavelength thereof).

A conventional CWDM module has multiple wavelength channels provided by several optical filters. Every optical filter is designed to satisfy the optical properties measured at incidence angle of 0° polarimeter. In assembling a CWDM module, it needs to take each channel as one separate optical filter, and then to assembly one integrate module. When an optical signal is transmitted to the CWDM module, one part of the optical signal may be allowed to pass or is reflected by different channels. It still needs to improve the conventional CWDM module due to large bulk.

BRIEF SUMMARY OF THE INVENTION

An object of the present invention is to provide a compact CWDM filter having high light transmittance.

To achieve the above object of the present invention, a CWDM filter in accordance with the present invention comprises a substrate and a multi-layer structure coated on one side of the substrate. The multi-layer structure has a first portion and a second portion. The first portion forms at least two Fabry-Perot cavities. The second portion is a coupling layer directly stacked on the substrate surface and located between the substrate and the first portion.

The first portion of the multi-layer structure has the construction of $(LH)^2 4L(HL)^3 H(LH)^3 4L(HL)^3 H(LH)^4 4L(HL)$ $H(LH)^3 4L(HL)^3 H(LH)^4 4L(HL)^4 H(LH)^3 4L(HL)^3 H(LH)^3$ $4L(HL)^2 H$, in sequence from the air side to the substrate side, where L is a low refraction index layer with a thickness of $\lambda_0/4$, H is a high refraction index layer with a thickness of $\lambda_0/4$, $\lambda_0$ being the center wavelength of the light transmitting through the CWDM filter.

The second portion of the multi-layer structure has the construction of LH4LH, where L is a low refraction index layer with a thickness of $\lambda_0/4$, H is a high refraction index layer with a thickness of $\lambda_0/4$, $\lambda_0$ being the center wavelength of the light transmitting through the CWDM filter.

The first portion of the present CWDM filter is coated on one low index layer of second portion neared the air side.

In comparison with the prior art, the CWDM filter of the present invention comprises not only several identical multi-layer cavity structures, but also a coupling layer, and the coupling layer is directly coated on the substrate. Thus, the CWDM filter of the present invention has a high light transmittance. Moreover, the CWDM filter has the advantages of small size and multiple channels by adopting technology of assembly and adjusting the angles of incidence and emergence.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1:
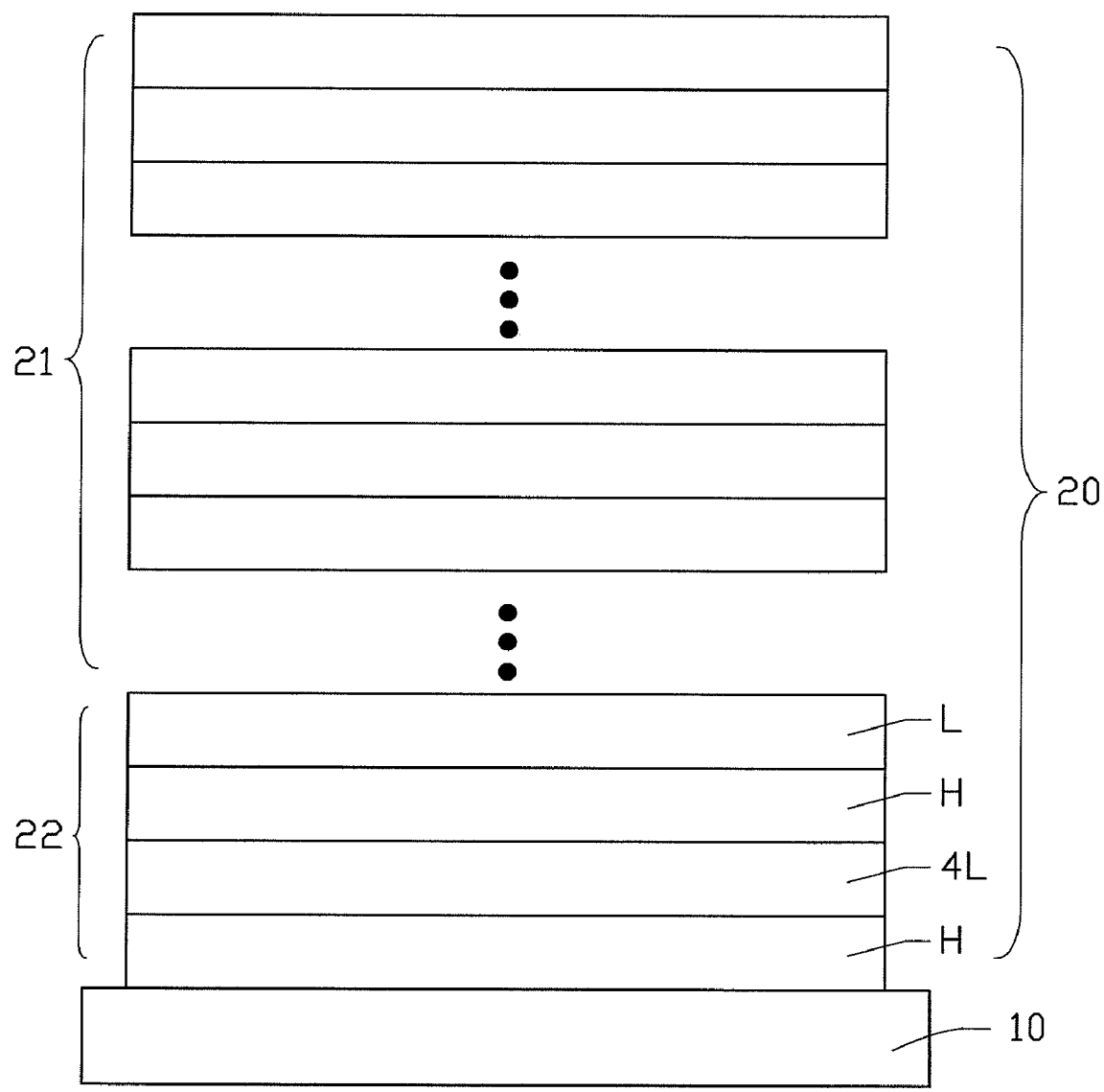
FIG. 1 schematically shows a multi-layer structure of a CWDM filter according to the present invention.

With reference to the drawings and in particular to FIG. 1, a CWDM filter in accordance with the present invention, generally designated with reference numeral 1, comprises a substrate 10 and a multi-layer structure 20 coated on one side of the substrate 10. The multi-layer structure 20 has the construction of $H(LH)^2 4L(HL)^3 H(LH)^3 4L(HL)^3 H(LH)^4 4L(HL)^4 H(L\ H)^3 4L(HL)^3 H(LH)^4 4L(HL)^4 H(LH)^3 4L(HL)^3 H(LH)^3 4L(HL)^2 HLH4L\ H/N_S$, wherein $N_s$ is the substrate 10, L is a low (refraction) index layer with a thickness of $\lambda_0/4$, H is a high (refraction) index layer with a thickness of $\lambda_0/4$, $\lambda_0$ being the center wavelength of the light transmitting through the CWDM filter 1. In the embodiment illustrated, $\lambda_0$ is 1574 nm.

The multi-layer structure 20 comprises a first portion 21 adjacent the air side and a second portion 22 formed on one side of the substrate 10. The first portion 21 is stacked on the second portion 22 and includes at least two Fabry-Perot cavities. From the air side to the substrate side, the configuration of the first portion 21 is expressed as: $H(LH)^2 4L(HL)^3 H(LH)^3 4L(HL)^3 H(LH)^4 4L(HL)^4 H(LH)^3 4L(HL)^3 H(LH)^4 4L(HL)^4 H(L\ H)^3 4L(HL)^3 H(LH)^3 4L(HL)^2 H$. The second portion 22 is a coupling layer, and can be expressed, from the air side to the substrate side, as: LH4L H. The coupling layer is directly vacuum-vaporized on the substrate surface, and the first portion 21 is coated on one low index layer L of the second portion 22 neared the air side. The coupling layer located between the substrate 10 and the first portion 21 serve to eliminate ripple so that the CWDM filter 1 can obtain high light transmittance. The spectrum characteristics graph of the CWDM filter is shown in FIG. 2.

Figure 2:
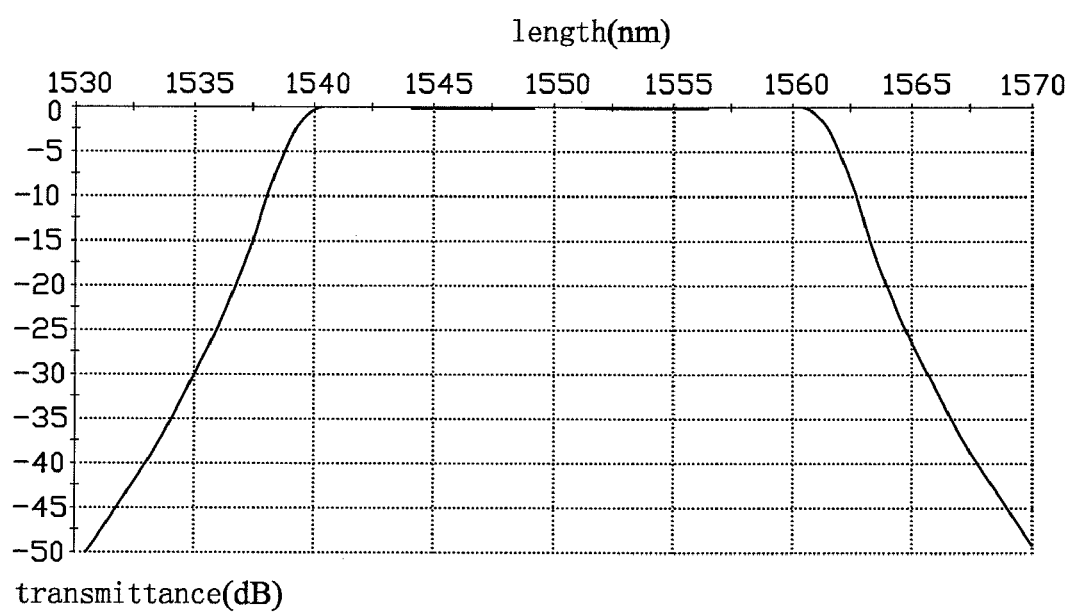
FIG. 2 shows a spectrum characteristics graph of the CWDM filter according to the present invention.

The peak value of light transmittance of the CWDM filter 1 in accordance with the present invention is greater than 93%, as shown in FIG. 2. In this embodiment, the surface polish diameter of the substrate 10 is 90 mm, and the thickness thereof is 10 mm. The substrate 10 is made of $SiO_2$, barium, lithium and sodium, etc. The low index layers of the first portion 21 and the second portion 22 are made of $SiO_2$ with refractive index of 1.38 to 1.44. The high index layers of the first portion 21 and the second portion 22 are made of TaO with refractive index of 2.1 to 2.7.

The following text details the multi-layer stack structure of the CWDM filter 1 of the present invention.

The second portion 22: the No. 1 layer is a high refraction index layer with a thickness of $\lambda_0/4$ and stacked on the substrate 10; the No. 2 layer is a low refraction index layer with a thickness of four multiples of $\lambda_0/4$ and stacked on the No. 1 layer; the No. 3 is a high refraction index layer with a thickness of $\lambda_0/4$ and stacked on the No. 2 layer; the No. 4 layer is a low refraction index layer with a thickness of $\lambda_0/4$ and stacked on the No. 3 layer.

The first portion 21: the No. 5 layer is a high refraction index layer with a thickness of $\lambda_0/4$ and stacked on the No. 4 layer; . . . the No. 10 is a low refraction index layer with a thickness of four multiples of $\lambda_0/4$ and stacked on the No. 9 layer; . . . the No. 24 layer is a low refraction index layer with a thickness of four multiples of $\lambda_0/4$ and stacked on the No. 23 layer; . . . the No. 40 is a low refraction index layer with a thickness of four multiples of $\lambda_0/4$ and stacked on the No. 39 layer; . . . the No. 56 is a low refraction index layer with a thickness of four multiples of $\lambda_0/4$ and stacked on the No. 55 layer; . . . the No. 72 is a low refraction index layer with a thickness of four multiples of $\lambda_0/4$ and stacked on the No. 71 layer; . . . the No. 88 is a low refraction index layer with a thickness of four multiples of $\lambda_0/4$ and stacked on the No. 87 layer; . . . the No. 102 is a low refraction index layer with a thickness of four multiples of $\lambda_0/4$ and stacked on the No. 101 layer; . . . the No. 107 is a high refraction index layer with a thickness of $\lambda_0/4$ and stacked on the No. 106 layer.

The conventional CWDM filter has a large size because it consists of several same multi-layer cavity structures stacked together. On the contrary, the CWDM filter 1 of the present invention includes not only several same multi-layer cavity structures but also a coupling layer. Thus, the CWDM filter 1 of the present invention has a high light transmittance. Moreover, the present CWDM filter is designed to satisfy the optical properties measured at incidence angle of 0° to 20° polarimeter. The CWDM filter 1 has advantages of small size and multiple channels by properly adjusting the angles of incidence and emergence.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A CWDM filter comprising a substrate and a multi-layer structure coated on one side of the substrate, the substrate having a surface polish diameter of 90 mm and a thickness of 10 mm, and being selectively made of $SiO_2$, barium, lithium and sodium; the multi-layer structure having a first portion and a second portion, the first portion comprising at least two Fabry-Perot cavities, the second portion being a coupling layer directly stacked on the substrate surface and located between the substrate and the first portion.

2. The CWDM filter as claimed in claim 1, wherein the first portion of the multi-layer structure has the following construction, in sequence from the air side to the substrate side:

$H(LH)^2 4L(HL)^3 H(LH)^3 4L(HL)^3 H(LH)^4 4L(HL)^4 H(LH)^3$
$4L(HL)^3 H(LH)^4 4L(HL)^4 H(LH)^3 4L(HL)^3 H(LH)^3 4L$
$(HL)^2 H$ where L is a low refraction index layer with a thickness of $\lambda_0/4$, H is a high refraction index layer with a thickness of $\lambda_0/4$, and $\lambda_0$ is center wavelength of light transmitting through the CWDM filter.

3. The CWDM filter as claimed in claim 2, wherein the second portion of the multi-layer structure has the construction of LH4LH, where L is a low refraction index layer with a thickness of $\lambda_0/4$, H is a high refraction index layer with a thickness of $\lambda_0/4$, and $\lambda_0$ is center wavelength of light transmitting through the CWDM filter.

4. The CWDM filter as claimed in claim 3, wherein the first portion is coated on one low index layer of second portion adjacent the air side.

5. The CWDM filter as claimed in claim 1, wherein the low index layers of the first portion and the second portion are made of $SiO_2$ with refractive index of 1.38 to 1.44.

6. The CWDM filter as claimed in claim 5, wherein the high index layers of the first portion and the second portion are made of TaO with refractive index of 2.1 to 2.7.

7. A CWDM filter including a substrate and a multi-layer structure coated on one side of the substrate, the substrate having a surface polish diameter of 90 mm and a thickness of 10 mm, and being selectively made of $SiO_2$, barium, lithium and sodium; the multi-layer structure having the following construction:

$H(LH)^2 4L(HL)^3 H(LH)^3 4L(HL)^3 H(LH)^4 4L(HL)^4 H(LH)^3 4L(HL)^3 H(LH)^4 4L(HL)^4 H(LH)^3 4L(HL)^3 H(LH)^3 4L(HL)^2 HLH4LH/N_S$ where $N_S$ is the substrate, L is a low refraction index layer with a thickness of $\lambda_0/4$, H is a high refraction index layer with a thickness of $\lambda_0/4$, and $\lambda_0$ is center wavelength of light transmitting through the CWDM filter.

8. The CWDM filter as claimed in claim 7, wherein the low index layers of the multi-layer structure are made of $SiO_2$ with refractive index 1.38 to 1.44.

9. The CWDM filter as claimed in claim 8, wherein the high index layers of the multi-layer structure are made of TaO with refractive index 2.1 to 2.7.

* * * * *